Oct. 6, 1964  A. H. LEFEBVRE ETAL  3,151,453
REHEAT COMBUSTION APPARATUS FOR A GAS TURBINE ENGINE
Filed May 7, 1962  3 Sheets-Sheet 1
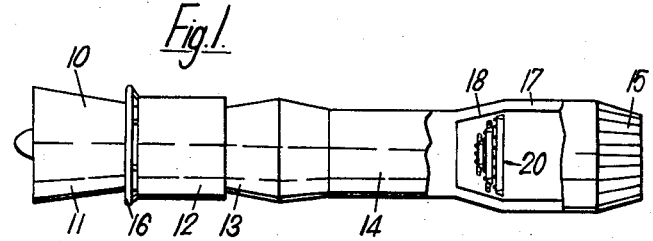
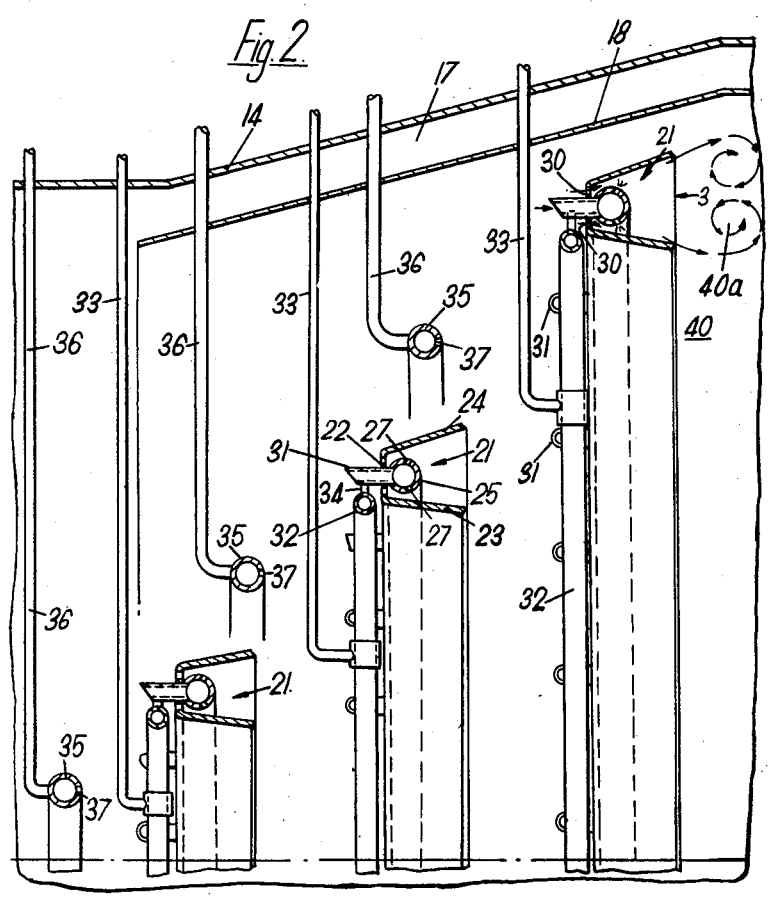

Oct. 6, 1964   A. H. LEFEBVRE ETAL   3,151,453
REHEAT COMBUSTION APPARATUS FOR A GAS TURBINE ENGINE
Filed May 7, 1962   3 Sheets-Sheet 2
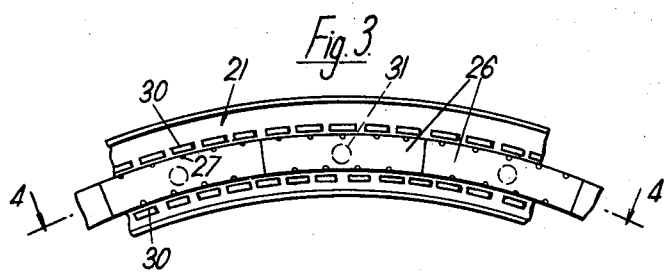
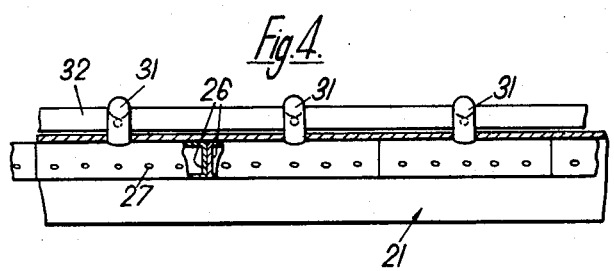
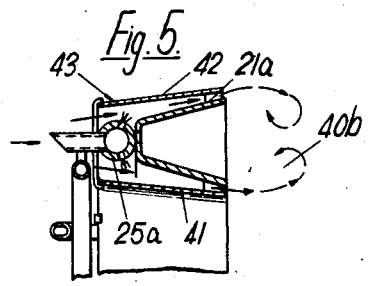

Oct. 6, 1964  A. H. LEFEBVRE ETAL  3,151,453
REHEAT COMBUSTION APPARATUS FOR A GAS TURBINE ENGINE
Filed May 7, 1962  3 Sheets-Sheet 3
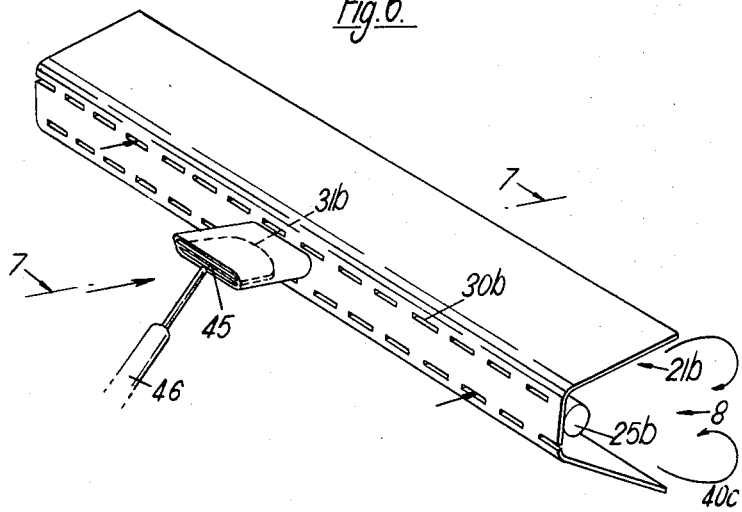
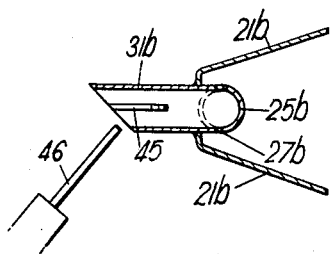
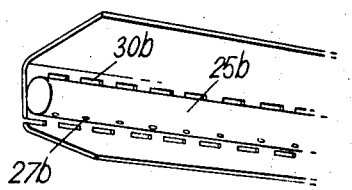

United States Patent Office 3,151,453
Patented Oct. 6, 1964

3,151,453
REHEAT COMBUSTION APPARATUS FOR A GAS TURBINE ENGINE
Arthur Henry Lefebvre, Allestree Park, and Gordon Cyril May, Mackworth, England, assignors to Rolls-Royce Limited, Derby, England, a company of Great Britain
Filed May 7, 1962, Ser. No. 208,156
Claims priority, application Great Britain, May 9, 1961, 16,886/61
7 Claims. (Cl. 60—39.72)

This invention concerns reheat combustion apparatus for a gas turbine engine.

According to the present invention, there is provided reheat combustion apparatus for a gas turbine engine comprising a jet pipe within which is concentrically mounted an annular manifold means for maintaining said manifold at least substantially filled with a combustible mixture containing air and fuel, the manifold being apertured to permit the said combustible mixture to pass out of all parts of the said manifold in substantially equal amounts, and combustion stabilising means adapted to be supplied with the said combustible mixture.

The fuel in the said combustible mixture may be in the form of droplets or may be completely atomised.

It will be appreciated that, since substantially equal amounts of the combustible mixture may pass out of all parts of the manifold, this will promote efficient combustion.

The present invention is of particular value where only a small quantity of liquid fuel is to be supplied to the manifold at a low fuel pressure, e.g. where the said small quantity is provided to give a low reheat boost in a reheat combustion apparatus in which a relatively large amount of reheat fuel is supplied to provide the maximum reheat boost.

The manifold may be apertured by being provided with a single aperture in the form of a slit extending around the whole or part of the circumference of the manifold. Preferably, however, the annular manifold is apertured by being provided with a plurality of apertures which are angularly spaced apart around the whole circumference of the manifold.

The reheat combustion apparatus preferably comprises axially extending conduit means whose upstream end is open to the turbine exhaust gases flowing through the jet pipe and whose downstream end is open to the annular manifold, and means for introducing liquid fuel into the axially extending conduit means so that the fuel is entrained in the turbine exhaust gases passing into the annular manifold.

The said means for introducing liquid fuel may be adapted to direct a jet of fuel against a splash plate mounted in the said axially extending conduit means.

The said conduit means preferably comprises a series of angularly spaced apart stub pipes. Thus the annular manifold may be made up of a series of curved sections which do not communicate with each other, each curved section having a said stub pipe communicating therewith and being provided with a plurality of angularly spaced apart apertures.

The annular manifold is provided with two rings of angularly spaced apart apertures, the rings of apertures being respectively disposed on the radially inner and outer sides of the annular manifold and each aperture in each ring being disposed substantially midway between the adjacent apertures in the other ring.

Means are preferably provided for directing at least one stream of turbine exhaust gases past the apertured parts or parts of the annular manifold so as to further atomise the combustible mixture passing therethrough.

Thus the combustion stabilising means may comprise a downstream facing annular gutter within which the annular manifold is mounted, the gutter having at its upstream end a radially extending wall provided with a slot or slots through which may flow the said stream of turbine exhaust gases, each said slot being aligned with an aperture in the annular manifold.

Alternatively the combustion stabilising means may comprise a downstream facing, annular gutter which is mounted immediately downstream of the annular manifold, the annular manifold and the gutter being mounted within an annular member through which may pass the said stream or streams of turbine exhaust gases.

The reheat combustion apparatus preferably also comprises injector means disposed upstream of the combustible stabilising means an annular manifold, for injecting liquid fuel into the turbine exhaust gases so that the said fuel may be carried by the turbine exhaust gases to the combustion stabilising means for combustion thereat.

Preferably there are a plurality of combustion stabilising means, annular manifolds, and injector means.

Each of the injector means preferably comprises an apertured manifold mounted concentrically within the jet pipe, and means for supplying said manifold with liquid fuel.

The invention also comprises a gas turbine engine provided with reheat combustion apparatus as set forth above.

The invention is illustrated, merely by way of example in the accompanying drawings, in which:

FIGURE 1 is a diagrammatic side view of a gas turbine engine incorporating reheat combustion apparatus according to the present invention.

FIGURE 2 is a broken away section showing part of the reheat combustion apparatus of the engine of FIGURE 1, FIGURE 3 is a view taken in the direction of the arrow 3 of FIGURE 2, FIGURE 4 is a broken away section taken on the line 4—4 of FIGURE 3, FIGURE 5 is a broken away section illustrating a modification of the reheat combustion apparatus according to the invention, FIGURE 6 is a perspective view illustrating another modification of the reheat combustion apparatus according to the invention, FIGURE 7 is a section taken on the line 7—7 of FIGURE 6, and FIGURE 8 is a broken away view taken in the direction of the arrow 8 of FIGURE 6.

In FIGURE 1 there is shown a gas turbine jet engine for an aircraft comprising an engine casing 10 within which there is disposed in flow series a compressor 11, combustion equipment 12, and a turbine 13, the turbine exhaust gases being directed to atmosphere through a jet pipe 14 whose downstream end is provided with a variable area nozzle 15.

Fuel for the combustion equipment 12 is supplied thereto by way of a manifold 16.

Within the jet pipe 14 and spaced therefrom by an annular gap 17 there is mounted a tubular heat shield 18. Mounted within the heat shield 18 is a reheat combustion apparatus indicated generally at 20.

The reheat combustion equipment 20 comprises three annular combustion stabilising gutters 21, which (when considered in the downstream direction) are of successively increased diameter, are mounted concentrically within the jet pipe 14, and are arranged successively downstream of each other. Each of the gutters 21 is substantially V-shaped and faces downstream, each gutter 21 having a substantially radial upstream wall 22 and substantially axial inner and outer walls 23, 24 respectively.

Mounted within each of the gutters 21 and disposed immediately adjacent the upstream wall 22 thereof is an annular manifold 25, the manifold 25 being spaced from the walls 23, 24 of the respective gutter. Each manifold 25 is made up of a series of curved sections 26 (FIGS. 3 and 4) which do not communicate with each other.

Each of the curved sections 26 is provided with two rings of angularly spaced apart apertures 27, the rings of apertures 27 being respectively disposed on the radially inner and outer sides of the respective section 26, and each aperture 27 being disposed substantially midway between the adjacent apertures in the other ring.

The upstream wall 22 of each of the gutters 21 is provided with two rings of slots 30, each slot 30 being aligned with an aperture 27.

A ring of angularly spaced apart, axially extending sub pipes 31 are mounted on the manifold 25 and extend through the wall 22. Each stub pipe 31 is open at its upstream end to the turbine exhaust gases flowing through the shield 18 and communicates at its downstream end with a curved section 26, a stub pipe 31 being provided for each of the curved sections 26.

Mounted within the ring of stub pipes 31 is a fuel manifold 32 to which reheat fuel may be supplied by way of a pipe 33. Radially extending branch pipes 34 extend from the fuel manifold 32 to each of the stub pipes 31.

Mounted concentrically within the jet pipe 14 are three annular main fuel manifolds 35 of successively increasing diameter (when viewed in a downstream direction), each manifold 35 being mounted upstream of a gutter 21 and inwardly thereof. Each of the manifolds 35, which is arranged to be supplied with fuel through a pipe 36, has a ring of angularly spaced apart apertures 37 on its downstream side.

In operation, a relatively large amount of liquid fuel is supplied to the manifolds 35 in order to provide "normal" reheat, whereas a relatively small amount of liquid fuel is, when necessary, supplied to the manifolds 32 in order to provide very low degrees of reheat.

The fuel supplied to the manifolds 35 passes out through the apertures 37 and is carried downstream, by the turbine exhaust gases, to combustion zones 40 adjacent to the respective gutters 21. Each gutter 21 forms a stabilised combustion zone 40a where the fuel/air mixture from the manifold 25 is burned.

The fuel supplied to each of the manifolds 32 passes to the branch pipes 34 and becomes entrained in the turbine exhaust gases passing through the stub pipes 31. The turbine exhaust gases contain unburnt air and there is therefore supplied to the manifolds 25 a mixture containing air and partly vaporised and partly atomised fuel. This fuel/air mixture, by reason of its volume, will completely fill the manifold 25 and will pass out of the apertures 27.

The air passing through the stub pipes 31 picks up the droplets of fuel and carries them to the apertures 27. Heat from the stabilised combustion zone 40a heats the mixture contained within the manifolds 25 and partly vaporises the fuel.

Streams of turbine exhaust gas pass through the slots 30 and between the manifold 25 and the walls 23, 24, of each gutter 21. These streams both assist in directing the combustible mixture downstream to the combustion zones 40a and also further atomise the fuel/air mixture. The streams also provide more air for combustion within the zones 40a.

In FIGURE 5 there is shown a modified embodiment of the present invention which is generally similar to that of FIGURE 2 except that each of the manifolds 25a is mounted upstream of an annular downstream facing gutter 21a, each manifold 25a and gutter 21a being mounted within and spaced from the inner and outer walls 41, 42 of an annular member 43. The upstream end of the member 43 is open to the flow of turbine exhaust gases. The turbine exhaust gases will therefore entrain the combustible mixture passing out of the manifolds 25a externally of the gutters 21a and so to combustion zones 40b.

In FIGURES 6–8 there is shown another modified embodiment of the present invention which is also generally similar to that of FIGURE 2.

In the embodiment of FIGURES 6–8, however, gutter sections 21b are provided, each gutter section 21b being provided with a flattened stub pipe 31b within which is mounted a splash plate 45. The interior of each flattened stub pipe 31 communicates with that of a manifold 25b.

A hypodermic fuel injector 46 is provided for each gutter section 21b, each hypodermic fuel injector 46 being adapted to direct a jet of fuel at the respective splash plate 45.

The upstream end of each flattened stub pipe 31b is open to the flow of turbine exhaust gases. Fuel directed at the splash plate 45 is therefore entrained in the turbine exhaust gases and passes to the manifold 25b where it becomes at least partly vaporised and passes out through apertures 27b therein.

Each manifold 25b has two lines of apertures 27b, each aperture 27b being aligned with a slot 30b in the upstream wall of the gutter section 21b. Each of the apertures 27b may, for example, have a diameter of 0.080".

Thus turbine exhaust gases passing through the slots 30b will carry the at least partly vaporised fuel from the apertures 27b to combustion zones 40c.

We claim:
1. Reheat combustion apparatus for a gas turbine engine comprising a jet pipe, an annular manifold mounted therein, a plurality of axially extending spaced apart stub pipes mounted in the annular manifold, the upstream ends of the axially extending stub pipes being open to the turbine exhaust gases flowing through the jet pipe and the down-stream end thereof being open to the annular manifold, a splash plate mounted in each stub pipe, means for directing a jet of liquid fuel against the splash plate in each stub pipe so that the fuel is entrained in the turbine exhaust gases passing into the annular manifold, said manifold having apertures to permit the said combustible mixture to pass therethrough in substantially equal amounts, and combustion stabilising means for controlling the said combustible mixture.

2. Reheat combustion apparatus for a gas turbine engine comprising a jet pipe, an annular manifold mounted therein, a plurality of axially extending circumferentially spaced apart stub pipes mounted in the annular manifold, the upstream ends of the stub pipes being open to the turbine exhaust gases flowing through the jet pipe and the downstream ends thereof being open to the annular manifold, means for introducing liquid fuel into the stub pipes so that the fuel is entrained in the turbine exhaust gases passing into the annular manifold, means providing apertures in said manifold to permit the said combustible mixture to pass out of the said manifold in substantially equal amounts, and combustion stabilising means for controlling the said combustible mixture.

3. Reheat combustion apparatus as claimed in claim 2 in which the annular manifold is made up of a series of curved sections which are out of communication with each other, each curved section having a said stub pipe communicating therewith and being provided with a plurality of angularly spaced apart apertures.

4. Reheat combustion apparatus as claimed in claim 2 in which the annular manifold is provided with two rings of circumferentially spaced apart apertures, the rings of apertures being respectively disposed on the radially inner and outer sides of the annular manifold and each aperture in each ring being disposed substantially midway between the adjacent apertures in the other ring.

5. Reheat combustion apparatus for a gas turbine engine comprising a jet pipe, an annular manifold mounted therein, a plurality of axially extending circumferentially spaced stub pipes mounted in the annular manifold, the upstream ends of the axially extending stub pipes being open to the turbine exhaust gases flowing through the jet pipe and the downstream ends thereof being open to the annular manifold, means for introducing liquid fuel into the axially extending stub pipes so that the fuel is entrained in the turbine exhaust gases passing into the annular manifold, means providing apertures in said manifold to permit the said combustible mixture to pass out of the said manifold in substantially equal amounts, means for directing at least one stream of turbine exhaust gases past the apertures in the annular manifold so as to atomise further the combustible mixture passing therethrough, and combustion stabilising means for controlling the said combustible mixture.

6. Reheat combustion apparatus as claimed in claim 5 in which the combustion stabilising means comprises a downstream facing, annular gutter which is mounted immediately downstream of the annular manifold, the annular manifold and the gutter being mounted within an annular member through which may pass the said stream of turbine exhaust gases.

7. Reheat combustion apparatus for a gas turbine engine comprising a jet pipe, a downstream facing annular gutter mounted within the jet pipe, an annular manifold mounted within the gutter, a plurality of axially extending circumferentially spaced apart stub pipes whose upstream ends are open to the turbine exhaust gases flowing through the jet pipe and whose downstream ends are open to the annular manifold, means for introducing liquid fuel into the axially extending stub pipes so that the fuel is entrained in the turbine exhaust gases passing into the annular manifold, means providing apertures in said manifold to permit the said combustible mixture to pass out of the said manifold in substantially equal amounts, a radially extending wall forming the upstream end of the gutter and provided with at least one slot through which may flow a stream of turbine exhaust gases, each slot being aligned with and disposed upstream of an aperture in the annular manifold, and combustion stabilising means adapted to be supplied with the said combustible mixture.

References Cited in the file of this patent

UNITED STATES PATENTS

| | | |
|---|---|---|
| 2,672,727 | Brown | Mar. 23, 1954 |
| 2,793,495 | Karcher | May 28, 1957 |
| 2,882,679 | Karcher et al. | Apr. 21, 1959 |
| 2,920,445 | Bailey | Jan. 12, 1960 |
| 2,948,117 | Nerad et al. | Aug. 9, 1960 |
| 2,967,394 | Jensen | Jan. 10, 1961 |
| 3,016,704 | Duncan et al. | Jan. 16, 1962 |

FOREIGN PATENTS

| | | |
|---|---|---|
| 1,229,596 | France | Sept. 8, 1960 |
| 1,245,920 | France | Oct. 3, 1960 |